United States Patent [19]
Barten

[11] Patent Number: 4,969,779
[45] Date of Patent: Nov. 13, 1990

[54] CUTTING INSERT

[75] Inventor: Alex Barten, Mitspeh Harashim-Maalot, Israel

[73] Assignee: Iscar Ltd., Tefen, Israel

[21] Appl. No.: 474,496

[22] Filed: Feb. 2, 1990

[30] Foreign Application Priority Data

Feb. 10, 1989 [GB] United Kingdom ............... 8903075

[51] Int. Cl.⁵ .......................................... B23B 27/22
[52] U.S. Cl. ................................ 407/114; 407/115; 407/117
[58] Field of Search ............... 407/113, 114, 115, 116, 407/117

[56] References Cited

U.S. PATENT DOCUMENTS

| | | | |
|---|---|---|---|
| 4,340,325 | 7/1982 | Gowanlock | 407/117 |
| 4,357,123 | 11/1982 | Zweekly | 407/117 |
| 4,479,744 | 10/1984 | Stricker | 407/114 |
| 4,558,974 | 12/1985 | Pono | 407/117 |
| 4,629,372 | 12/1986 | Hastor | 407/117 |
| 4,778,311 | 10/1988 | Niemi | 407/117 |
| 4,832,541 | 5/1989 | Noguchi | 407/117 |
| 4,844,668 | 7/1989 | Petterson | 407/117 |
| 4,859,122 | 8/1989 | Patterson | 407/114 |

*Primary Examiner*—Frederick R. Schmidt
*Assistant Examiner*—Blynn Shideler
*Attorney, Agent, or Firm*—Burgess, Ryan and Wayne

[57] ABSTRACT

A metal cutting insert having front and side cutting edges located in a plane and having a front chip deflector surface spaced from the cutting edges, projecting out of said plane and directed along the length of the front cutting edge and first and second side chip forming grooves directed respectively along the lengths of the side cutting edges, each groove comprising a descending surface, a groove base and a rising chip deflector surface the latter projecting out of said plane, said descending and rising surfaces being formed with successive ridges and recesses along the length thereof.

6 Claims, 3 Drawing Sheets

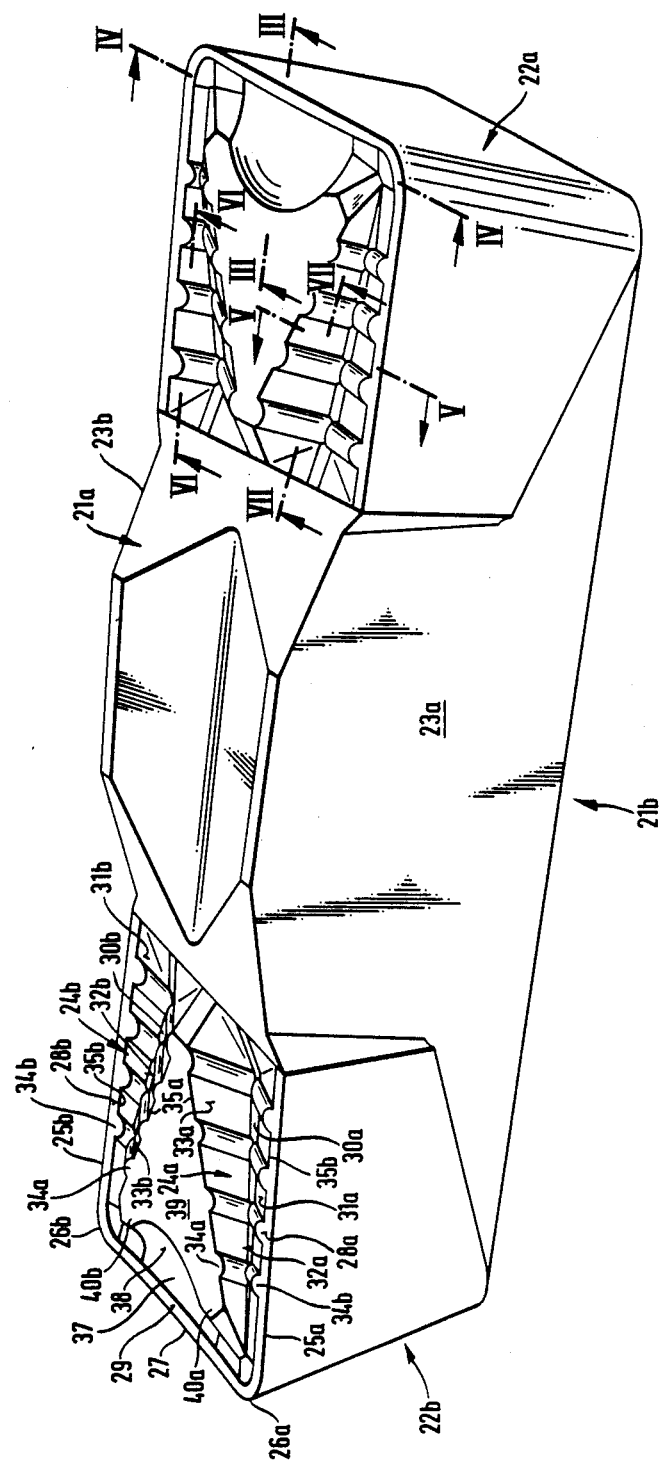

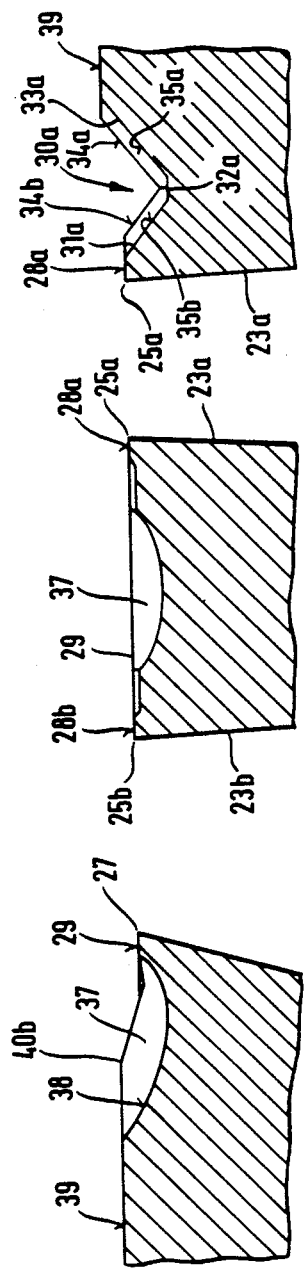
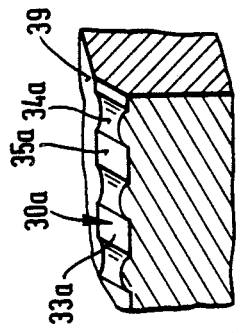
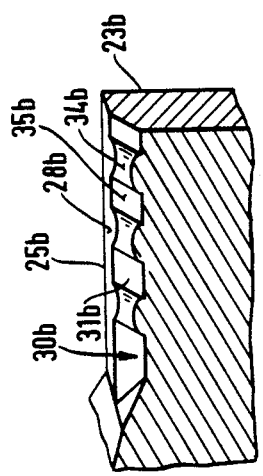

CUTTING INSERT

FIELD OF THE INVENTION

This invention relates to a cutting insert formed of a hard wear-resistant material such as, for example, a cemented hard metal carbide and intended for use in metal grooving, parting, turning or boring operations.

BACKGROUND OF THE INVENTION

Such inserts are generally of the replacable kind and are designed to be firmly held in an appropriate receiving seat formed in an insert holder. Thus, for example, the insert can be formed with a tapering, wedge-shaped body so as to be wedge clamped within a correspondingly wedge-shaped slot formed in the insert holder. Alternatively, the insert can be clamped between a pair of jaws of the insert holder, which jaws define a receiving slot, the jaws being biased into clamping the insert by suitable mechanical means.

Seeing that the metal cutting operations involve the removal (from the workpiece being cut) of metal, in the form of chips, the interests of safety and efficiency of cutting require that these chips be effectively removed from the cutting region. To this end it has long been known to provide such cutting inserts with chip breaking and/or chip forming means so as to ensure that the chips, shortly after their formation, are so shaped and/or broken that they can be readily removed from the work area without interfering with the continuing cutting process and without endangering the operating personnel.

In the use of such cutting inserts for the purposes indicated, it has long been known to draw a distinction between tools for parting or grooving operations, on the one hand, and tools for lateral turning (e.g. cylindrical) operations, on the other hand. In the first instance, there is a radial movement of the tool into the rotating workpiece to be grooved or parted whilst, in the second instance, there is a lateral or transverse movement of the tool. When carrying out these differing kinds of operations, it has long been known that it is necessary to replace the holder and the cutting insert when passing from one operation to the other, seeing that the cutting insert employed for any particular operatin is designed so as to meet only the requirements of that operation.

This necessity to replace the cutting insert in accordance with the nature of the cutting operatin is clearly time-consuming and requires the ready availability of differing kinds of holders and cutting inserts for differing kinds of operations. In the light of this existing situation, the Applicants have developed a new tool cutting system known by the Applicants' trademark CUT-GRIP, wherein the same cutting insert can be used for both parting and grooving operations, on the one hand, and also for lateral turning operations, on the other hand. Such an insert will hereinafter be referred to as a "multidirectinal cutting tool insert".

With the use of such multidirectional cutting tool inserts, the problem arises of effectively controlling the formation of chips whether these arose from radially directed parting or grooving operations or from laterally directed turning operations.

BRIEF SUMMARY OF THE INVENTION

It is therefore an object of the present invention to provide a new and improved multidirectional cutting tool insert with effective chip control means.

According to the present invention there is provided a metal cutting insert having top and bottom faces and front, rear and a pair of side peripheral faces said front and side cutting edges being located in a plane; a front cutting edge formed at the intersection of the top face and the front peripheral face and first and second side cutting edges formed respectively at the intersections of the top face and the two side peripheral faces; chip forming means located on the top face within an area defined by the cutting edges and comprising a front chip deflector surface spaced from the cutting edges, projecting out of said plane and directed along the length of the first cutting edge and first and second side chip-forming grooves directed along the lengths of said first and second side cutting edges, each groove comprising a descending surface, a groove base and a rising chip deflector surface, the latter projecting out of said plane, said descending and rising surfaces being formed with successive ridges and recesses along the lengths thereof.

Preferably each groove base is of increasing width and depth below said plane in a direction extending from said front cutting edge. The front chip deflector surface together with rising chip deflector surfaces preferably terminates in an insert plateau which is raised with respect to the plane. The plateau is preferably formed with a pair of spurs which extend towards the front cutting edge and which serve to separate the front chip forming means from the grooves.

With such a cutting insert, in accordance with the present invention, when it is used in a radially directed parting or grooving operation the chips which are formed are shaped by the spurs so as to acquire a substantially narrowed rigidized cross-section. When, however, laterally directed turning operations are carried out, then the provision of the side chip deflector grooves is effective in producing chips of corrugated cross-section thus ensuring chip breaking over a wide range of operating conditions, thereby allowing for the carrying out of both preliminary and finishing operations with the same tool. This particular insert is of special value when working with highly ductile materials such as stainless steel or nickel-based alloys.

BRIEF SUMMARY OF THE DRAWINGS

For a better understanding of the present invention, and to show how the same may be carried out in practice, reference will now be made to the accompanying drawings, in which:

FIG. 2 is a perspective view of a multidirectional cutting tool insert in accordance with the present invention; and FIGS. 3, 4, 5, 6 and 7 are respective cross-sectional views of the insert shown in FIG. 2 taken along the line III—III; IV—IV; V—V; VI—VI and VII—VII.

DETAILED DESCRIPTION OF PREFERRED EMBODIMENT

Figure 1A:
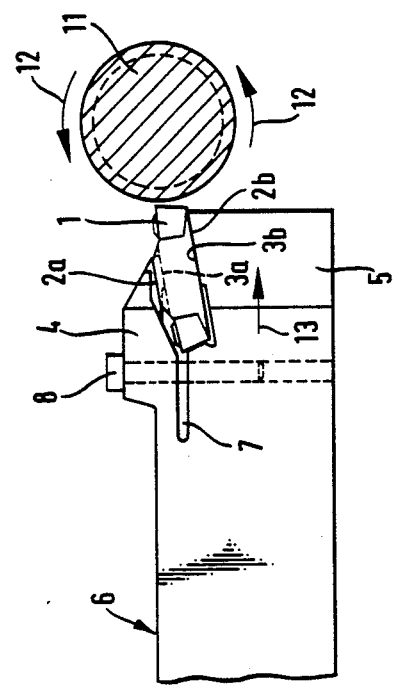
FIGS. 1a and 1b are respectively side and top elevations of a tool cutting insert of a kind to which the invention is applied, shown clamped in a tool holder.

Reference will first be made to FIG. 1 of the drawings, wherein is illustrated the mode of mounting of a multidirectional tool insert in a tool support and the use of this insert for radially directed grooving operations and laterally directed turning operations. As can be seen in the figure, a multidirectional cutting tool insert 1 (the detailed construction of which will be described below with reference to the remaining figures), having a pair of longitudinally parallel upper and lower surfaces 2a and 2b, is clamped between corresponding parallel surfaces 3a and 3b of jaws 4 and 5 formed integrally with a tool holder body 6, the surfaces 3a and 3b defining a receiving slot designed to receive the insert 1. This receiving slot communicates with a rearwardly directed slit 7, the provision of which allows for the necessary resilience required for clamping. The insert 1 is firmly clamped within the receiving slot by means of a clamping screw 8 which, when tightened, causes the jaws 4 and 5 clampingly to bear against the corresponding surfaces 2a and 2b of the insert. The surfaces 2a and 2b are respectively formed with longitudinally extending V-shaped faces in which mate correspnding convex V-shaped ribs formed of the corresponding jaw surfaces 3a and 3b. By virtue of the concave to convex mating of the ribs of the jaws 4 and 5 with the surfaces 2a and 2b, lateral movement of the insert with respect to the insert holder 6 is prevented.

Figure 1B:
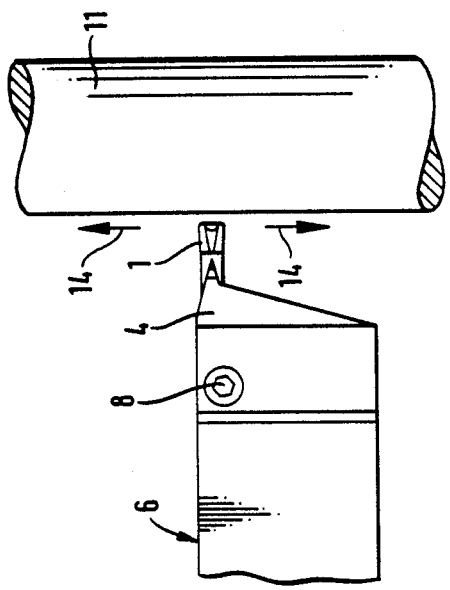

As seen in the drawings, the tool is designed for use in machining a cylindrical workpiece 11 which is designed to be rotated by a workpiece holder (not shown) in the direction of the arrows 12. When it is desired to perform a grooving or parting operation, then the movement of the tool is along the direction of the arrow 13, i.e. radial with respect to the workpiece. When, however, the tool is used to effect a turning operation, then the tool moves in a transverse direction (arrow 14) as seen in FIG. 1b.

Reference will now be made to FIGS. 2 to 7 of the drawings for a detailed description of a preferred embodiment of a cutting insert in accordance with the invention. As seen in the drawings, the cutting insert consists of a polygonal body of substantially paralelepipedal shape. The insert has top and bottom faces 21a and 21b, front and rear peripheral faces 22a and 22b and side peripheral faces 23a and 23b. The top and bottom faces 21a and 21b formed with longitudinally extending concave keying grooves 24a and 24b of V-shaped cross-section.

The insert is formed at diametrically opposite corners thereof with respective cutting ends which, when the insert is mounted in the insert holder as shown in FIG. 1 of the drawings, are alternately exposed for use. The cutting ends are of identical construction and one of them will now be described. At the intersection of the top face 21a and the peripheral faces 23a and 23b are formed first and second side cutting edges 25a and 25b which respectively extend from insert corners 26a and 26b to an intermediate position along the insert. Formed at the intersection of the top face 21a and the front peripheral face 22b is a front cutting edge 27 which extends between the corners 26a and 26b.

The cutting edges 25a, 25b and 27 are formed with respective land surfaces 28a, 28b and 29 which together with the cutting edges are located in a common plane. Formed in the top surface 21a and along the lengths of the cutting edges 25a and 25b are respective chip forming grooves 30a and 30b. The groove 30a comprises a descending surface 31a, a groove base 32a and a rising chip deflector surface 33a. Similarly, the groove 30b also comprises a descending surface a groove base 32b and a rising chip deflector surface. The groove bases 32a and 32b are located below the common plane. The descending surfaces 31a and 31b are formed with successive ridges 34a and 34b and recesses 35a and 35b. Similarly, the rising chip deflector surfaces 33a and 33b are formed with successive ridges 34a and 34b and recesses 35a and 35b. The groove bases 32a and 32b extend in width in a direction away from the cutting edge 27 and also extend downwardly with respect to the common plane by an amount which increases in a direction away from the cutting edge 27.

Also formed in the top surface 21 and along the length of the cutting edge 27 is a curved recess 37 which curves inwardly and downwardly from the land surface 29 and then curves upwardly to form a chip deflector surface 38. The chip deflector surfaces 33a, 33b and 38 terminate in a plateau 39 above the level of the common plane. The plateau 39 is formed with a pair of spurs 40a and 40b which respectively separate the chip forming means constituted by the walls of the recess 37 from the chip forming means constituted by the walls of the grooves 30a and 30b.

In use, and when the cutting insert is used in a radially directed grooving operation, the chip which is cut by the cutting edge 27 and which is initially of a width equal to the width of the cutting edge, encounters and passes at its edges over the front wall of the spurs 40a and 40b. The longitudinal edges of the chip are therefore deflected upwardly with respect to the central portion of the chip which flows, unsupported over the curved recess 37. The chip therefore acquires a narrowed and relatively rigidized shape and upon striking the chip deflector 38, curls into a spiral and breaks for ready disposal.

On the other hand, when the insert is used for turning in a transverse direction, the chips which are cut by the side cutting edges 25a or 25b pass over the lands 28a and 28b down the descending surfaces 31a and 31b, to be deflected upwardly by the rising deflector surfaces 33a and 33b. By virtue of the ridged form of the surfaces 31a, 31b and 33a, 33b the chips acquire a corrugated cross-sectional shape which facilitates their ultimate breaking.

The particular chip forming means just described with reference to the illustrated insert is particularly effective for use with highly ductile materials such as, for example stainless steel and nickel based alloys such as are particularly used in the aeronautical industry.

I claim:

1. A metal cutting insert having top and bottom faces and front, rear and a pair of side peripheral faces; a front cutting edge formed at the intersection of the top face and the front and/or rear peripheral faces and first and second side cutting edges formed respectively at the intersections of said top face and the two side peripheral faces, said front and side cutting edges being located in a plane; chip forming means located on said top face within an area defined by said cutting edges and comprising a front chip deflector surface spaced from said cutting edges projecting out of said plane and directed along the length of said front cutting edge and first and second side chip forming grooves directed along the lengths of said first and second side cutting edges each groove comprising a descending surface a groove base and a rising chip deflector surface the latter projecting out of said plane, said descending and rising surfaces being formed with successive ridges and recesses along the length thereof.

2. A cutting insert according to claim 1, wherein each groove base is of increasing width and depth below said plane in a direction extending from said front cutting edge.

3. A cutting insert according to claim 1, wherein said front chip deflector surface together with said rising chip deflector surfaces terminate in an insert plateau which is raised with respect to said plane.

4. A cutting insert according to claim 3, wherein said front chip deflector surface is constituted by a curved rising surface of a curved recess formed in said insert.

5. A cutting insert according to claim 4, wherein said plateau is formed with a pair of spurs which extend towards said front cutting edge and serve to separate said recess from said grooves.

6. A cutting insert according to claim 1, wherein each cutting edge is separated from said chip forming means by a land surface.

* * * * *